United States Patent
Stubbs

(10) Patent No.: US 6,930,994 B1
(45) Date of Patent: Aug. 16, 2005

(54) DYNAMIC ALLOCATION OF RADIO RESOURCES IN A PACKET SWITCHED COMMUNICATIONS-SYSTEM

(75) Inventor: Martin Stubbs, Bristol (GB)

(73) Assignee: Orange Personal Communications Services Limited, Bristol (GB)

( * ) Notice: Subject to any disclaimer, the term of this patent is extended or adjusted under 35 U.S.C. 154(b) by 0 days.

(21) Appl. No.: 09/719,011

(22) PCT Filed: Jun. 3, 1999

(86) PCT No.: PCT/GB99/01767

§ 371 (c)(1),
(2), (4) Date: Jan. 12, 2001

(87) PCT Pub. No.: WO99/63773

PCT Pub. Date: Dec. 9, 1999

(30) Foreign Application Priority Data

Jun. 3, 1998 (GB) .................................. 9811966

(51) Int. Cl.[7] ............................................... H04J 3/12

(52) U.S. Cl. ...................... 370/348; 370/349; 370/468

(58) Field of Search .............................. 370/329, 343, 370/348, 349, 435, 437, 468

(56) References Cited

U.S. PATENT DOCUMENTS

| 5,416,770 A | 5/1995 | Stoner et al. |
| 5,448,620 A | 9/1995 | Gershkovich et al. |
| 5,625,877 A * | 4/1997 | Dunn et al. ................. 370/329 |
| 5,666,348 A | 9/1997 | Thornberg et al. |
| 6,111,863 A * | 8/2000 | Rostoker et al. ............ 370/329 |
| 6,359,656 B1 * | 3/2002 | Huckins ...................... 370/468 |

FOREIGN PATENT DOCUMENTS

| EP | 0 732 826 | 9/1996 |
| EP | 0 782 364 | 7/1997 |
| WO | WO 96/22665 | 1/1996 |
| WO | WO 97/50266 | 12/1997 |
| WO | WO 99/41920 | 8/1999 |

* cited by examiner

Primary Examiner—Salvatore Cangialosi
(74) Attorney, Agent, or Firm—Knobbe Martens Olson & Bear LLP

(57) ABSTRACT

Voice and/or image data packets are transferred by a packet handler between user stations in a GSM-type mobile communications system using a General Packet Radio Service (GPRS) data link. Control data for controlling a call is stored in a data store accessible by the packet handler. The control data identifies call participants and the identity of a participant who has currently seized the call. A mobile station capable of video conferencing is operable in a half-duplex video conferencing mode, in which intermittent transmission of video data is controlled by depression of a transmit button.

29 Claims, 11 Drawing Sheets

DYNAMIC ALLOCATION OF RADIO RESOURCES IN A PACKET SWITCHED COMMUNICATIONS-SYSTEM

FIELD OF INVENTION

This invention relates to mobile communications, such as cellular communications. The invention is particularly, but not exclusively, applicable to GSM-type mobile communications systems.

BACKGROUND OF THE INVENTION

An example of a cellular communications system which provides voice dispatch services is the Motorola (trademark) integrated digital enhanced network, or iDEN (trademark), system. The system includes Enhanced Base Transceiver Systems (EBTSs) at cell sites which link mobile terminals to the fixed network equipment via a TDMA radio interface, and which are connected to controlling base station controllers (BSCs). The BSCs provide a link with a mobile switching centre (MSC) which provides conventional circuit switching with a public services telephone network (PSTN), and a Metro Packet Switch (MPS) which provides switching for the dispatch services. A Dispatch Application Processor (DAP) coordinates and controls dispatch communications, by registering the identifications and locations of mobile terminals active in the system.

The iDEN system provides both voice dispatch services, circuit-switched call services and other data communications services, such as a short message service.

U.S. Pat. No. 5,416,770 describes a voice dispatch cellular communications system, in which audio data packets are transported via frame relay links. Communication is established between a plurality of communication units by replicating the transmitted data packets, and distributing the replicated packets to identified target base stations.

U.S. Pat. No. 5,448,620 describes a mobile terminal which is operable in both a voice dispatch mode and a telephone interconnect mode.

A known GSM network, referred to as a public land mobile network (PLMN), is schematically illustrated in FIG. 1. A mobile switching centre (MSC) 2 is connected via communication links to a number of base station controller (BSCs) 4. The BSCs 4 are dispersed geographically across areas served by the mobile switching centre 2. Each BSC 4 controls one or more base transceiver stations (BTSs) 6 located remote from, and connected by further communication links to, the BSC. Each BTS 6 transmits radio signals to, and receives radio signals from, mobile stations 8 which are in an area served by that BTS. That area is referred to as a "cell". A GSM network is provided with a large number of such cells, which are ideally contiguous to provide continuous coverage over the whole network territory.

A mobile switching centre 2 is connected via communications links to other mobile switching centres in the remainder of the mobile communications network 10, and to other networks such as a public service telephone network (PSTN), which is not illustrated. The mobile switching centre 2 is provided with a home location register (HLR) 12 which is a database storing subscriber authentication data including the international mobile subscriber identity (IMSI) which is unique to each mobile station 8. The IMSI is also stored in the mobile station in a subscriber identity module (SIM) along with other subscriber-specific information.

The mobile switching centre is also provided with a visitor location register (VLR) 14 which is a database temporarily storing subscriber authentication data for mobile stations active in its area.

GSM was originally designed to support full duplex, circuit-switched voice calls.

A new element of functionality is added in the GSM Phase 2+Technical Specifications, which is referred to as the advanced speech call items (ASCI). This provides for group calls which are broadcast to members within a group. In order to establish a broadcast group call, an originating mobile station sends a service request to the MSC, containing the requested group identity. The MSC authenticates the subscriber using the VLR.

If the authentication check is successful, the MSC requests identification data for the members of the group from a group call register. With this information, the MSC sets up connections between the receiving mobile stations and a group call dispatcher. Each of the cells in which recipient mobile stations are located pages a notification, containing the identity of the group being called and the description of the channel allocated for the group call broadcast. The group call dispatcher transmits the group call data to each of those cells, for broadcast on the allocated channels.

A further element of functionality which is added to GSM in the GSM Phase 2+ Technical Specification is the general packet radio service (GPRS).

GPRS provides a packet-mode service to transfer high-speed and low-speed data and signalling efficiently over the GSM radio network. It is designed to support a range of types of data transfer, from intermittent and bursty data transfers to the occasional transfer of large volumes of data. It is envisaged for use in Internet services, e-mail and other data services.

GPRS includes facilities for both point to point (PTP) and point to multipoint (PTM) data packet transfer. In PTM data packet transfer, the data packets are broadcast in all of the cells in a defined geographical area. In each case, GPRS transmits the data packets transparently, insofar as other than ensuring that the data packets are received correctly at their destination, there is no knowledge of the contents of the data packets on the network side.

The GPRS radio interface is placed in a flexible number of TDMA time slots of the GSM physical radio interface used for circuit-switched traffic channels and signalling channels. The same GPRS radio resources are shared by all mobile stations in a cell, the radio resources being reserved by or for mobile stations only when there are data packets to be sent.

The packet-oriented network infrastructure includes a packet data network having packet switches in the form of GPRS support nodes (GSNs) interconnected by a GPRS backbone network, and including a gateway GPRS support node (GGSN) for routing data packets to and from an external packet data protocol (PDP) network, using a protocol such as TCP/IP, X.25 and the like.

SUMMARY OF THE INVENTION

In accordance with one aspect of the present invention there is provided a method of controlling communication between user stations using a mobile communications system having a radio interface, said method comprising:
  providing a data packet handler connected to a packet data network;
  holding control data, indicating a state of a call between a first user station and a second user station;

dynamically assigning radio resources for the transfer of data packets carrying call data for said call over said radio interface, such that the amount of radio resources assigned varies in accordance with the amount of call data to be transferred at different points in said call; and controlling the transfer of data packets between said first and second user stations, using said data packet handler, in accordance with said control data.

The state of a call may be held in a network-side store, to allow control of the communication between the mobile stations. The functionality provided by a packet data network, and the nature of radio resource allocation and control, is such that data transfer is possible throughout a call, even when the transfer of data is intermittent, without requiring an ongoing circuit-switched connection between the user stations. The data transferred may be voice call data, or video call data.

In accordance with a further aspect of the invention there is provided a method of handling the transfer of data in a GSM-type mobile communications system, said method comprising:

receiving a first data packet from a first user station, said first data packet containing a recipient ID;

mapping said recipient ID to a packet network protocol address whereby routing to a second user station is identified by a gateway GPRS support node; and transmitting a second data packet to said gateway GPRS support node, said second data packet containing said packet network protocol address.

This aspect provides functionality allowing the transfer of data packets between user stations using GPRS, wherein a known recipient ID, rather than a packet network protocol address (which may be only temporarily allocated), may be used by the first user station to identify the second user station.

In accordance with a further aspect of the invention there is provided a method of conducting communications between user stations using a mobile communications system, each said user station comprising a camera for picking up an image of the user and a display for displaying an image of a remote party, said method comprising establishing a data transfer connection between said user stations, and controlling said connection in a half-duplex mode such that a user station may perform one of either only receiving or only transmitting image data for a first period sufficient to receive or transmit image data forming an image, and perform the other of only receiving or only transmitting video image data for a second period following said first period and sufficient to transmit or receive image data forming an image.

In accordance with a still further aspect of the invention there is provided a mobile station adapted to conduct video image communications, said mobile terminal having a half-duplex communications mode controlled by a data processor which in that mode prevents the transmission of video image data during the reception of video image data and which allows the transmission of video image data during a period selected by a user.

These aspects provide a method of conducting communications, and a mobile station, which may be used for video conferencing in a novel and advantageous fashion. By limiting the communications to a half-duplex mode, the bandwidth and mobile station power requirements needed for the call may be reduced.

In addition, operation in a dispatch communications mode, wherein the video data is distributed amongst groups of recipients which may each both transmit and receive data, is possible. One party may seize the call to transmit video data which is received by the remaining participants. The call may then be subsequently seized by different participants.

Further aspects of the invention are defined in the appended claims, and features thereof will be apparent from the following description.

BRIEF DESCRIPTION OF THE DRAWINGS

Embodiments of the invention will now be described, by way of example only, with reference to the accompanying drawings, wherein.

DETAILED DESCRIPTION OF CERTAIN EMBODIMENTS OF THE INVENTION

Figure 2:
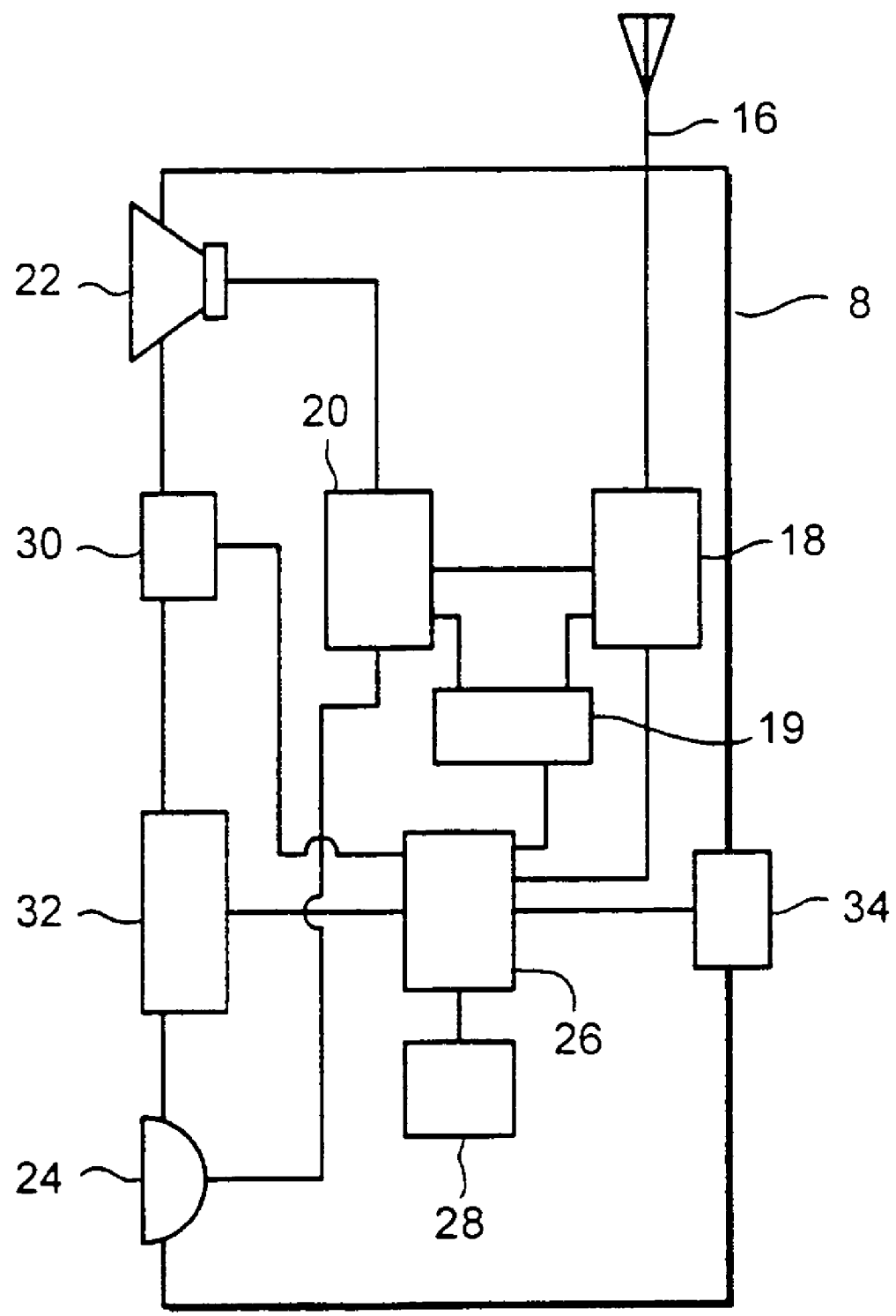
FIG. 2 is a schematic block diagram of a mobile station in accordance with a first embodiment of the invention.

Referring to FIG. 2, a GSM-compliant mobile station 8 in accordance with an embodiment of the present invention is a handset which comprises a transmit/receive aerial 16, a radio frequency transceiver 18, a GPRS module 19 which includes a packetiser/depacketiser and buffer store, a speech coder/decoder 20 connected to a loudspeaker 22 and a microphone 24, a processor circuit 26 and its associated memory 28, an LCD display 30, a manual input port (keypad) 32 and a push-to-talk button 34. The mobile station is connected to a removable subscriber identity module (SIM) not shown, via electrical contacts.

Figure 1:
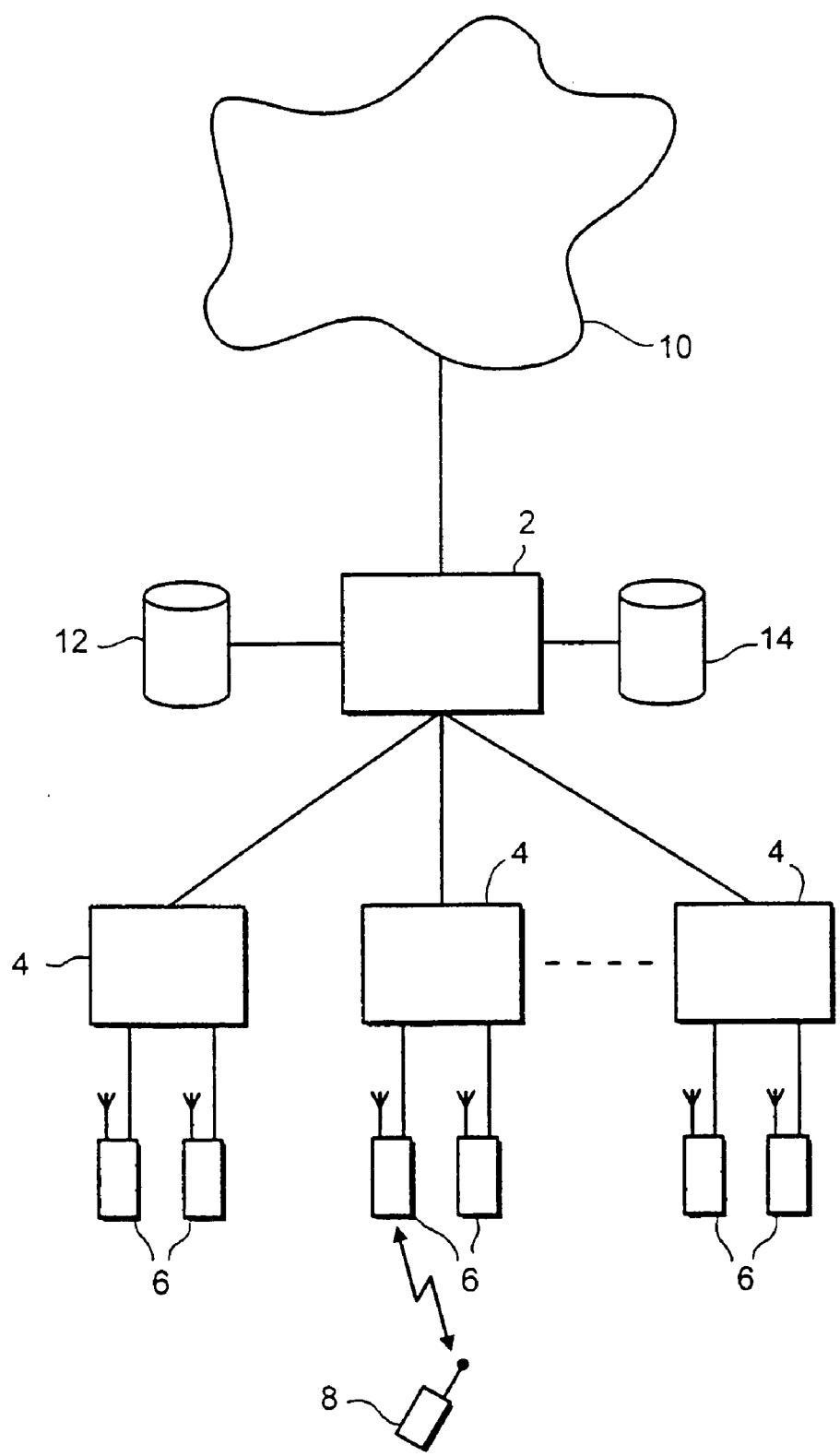
FIG. 1 is a schematic block diagram of a known public land mobile network.
Figure 3:
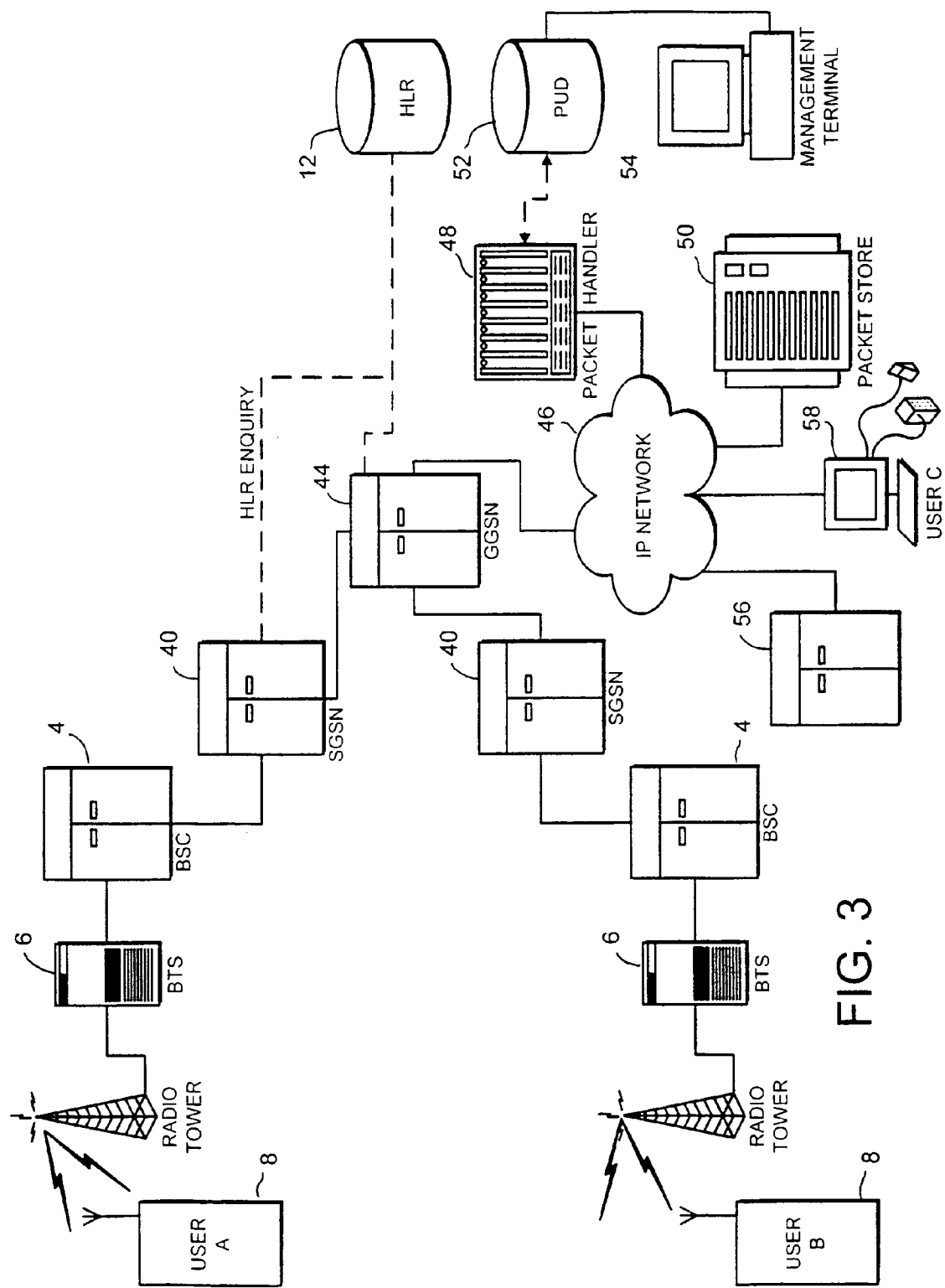
FIG. 3 is a schematic block diagram of a mobile communications network arranged in accordance with the present invention.

FIG. 3 is a schematic illustration of a GSM-type PLMN arranged in accordance with an embodiment of the present invention. The PLMN includes GPRS support nodes, including one or more serving GPRS support nodes (SGSNs) 40, and a gateway GPRS support node (GGSN) 44. The PLMN includes all of the components described in relation to FIG. 1.

The mobile station 8 may conduct circuit-switched calls, via the MSC 2, immediately after camping on to a serving cell, as in the prior art.

The GGSN 44 is the node provided to interface the PLMN with an external packet data network 46, such as a TCP/IP network. It contains routing information for active GPRS users in the PLMN, which is used to transmit data packets, referred to as packet data protocol protocol data units (PDP PDUs) to the current point of attachment of a mobile station in the PLMN from the packet data network. The GGSN provides a mapping function for mapping a packet data protocol (PDP) address, whereby a mobile user is identified in the packet data network 46, to a mobile station identity, whereby the mobile user is identified in the PLMN. The PDP address of a mobile user conforms with the standard addressing scheme of the respective network layer service used in the packet data network 46, for example an IP version 4 address, an IP version 6 address or an X.121 address.

A mobile user may be allocated a permanent, or "static" PDP address, which is stored in the mobile station 8 and the HLR 12, or may be allowed to request a temporary, or "dynamic" PDP address, which is allocated by the GGSN 44 on request.

The SGSNs 40, 42 are referred to as serving GPRS support nodes, in that these nodes are those which serve mobile stations 8 in their routing areas. On logon to the GPRS service of a mobile station, the SGSN establishes a mobility management context containing information pertaining to mobility and security for the mobile station. The SGSN also establishes a routing context, referred to in GPRS as a "PDP context", with the GGSN 44 to be used by the mobile station 8 to access the packet data network 46.

The SGSN and the GGSN functionalities may be combined in the same physical node, or they may reside in different physical nodes.

The packet data network 46 may be the public Internet, an intranet connection or a leased line. The packet data network 46 may also provide connections with other elements, such as a GGSN 56 of other PLMNs or fixed terminals 58.

Thus, with the additional functionality of the SGSNs 40 and the GGSN 44 in the PLMN, and the GPRS module 19 in the mobile stations 8, the mobile networks and users are GPRS enabled, whereby the mobile users may transmit and receive packet mode data. For example, the mobile user may use the mobile station 8 in order to access Web pages, using terminal equipment attached to the mobile station 8, on the public Internet, via the gateway functionality provided by the GGSN 44 and the packet mode transfer functionality provided in the remainder of the network including the SGSNs 40, 42, the BSCs 4, the BTSs 6 and the GPRS radio interface.

The GPRS radio interface is described in GSM 03.64 Version 5.1.0, entitled "Digital Cellular Communications System (Phase 2+)"; General Packet Radio Service (GPRS); Overall Description of the GPRS Radio Interface; Stage 2, published by European Telecommunications Standard Institute, the contents of which are incorporated herein by reference.

The GPRS architecture and transmission mechanism, mobility management functionality, network management functionality, radio resource functionality, packet routing and transfer functionality, transmission and information storage using GPRS are described in GSM 03.60 Version 5.2.0, entitled "Digital Cellular Telecommunications System (Phase 2+)"; General Packet Radio Service (GPRS); Service Description; Stage 2, published by the European Telecommunications Standard Institute, the contents of which are incorporated herein by reference.

In addition to the standard GPRS infrastructure, this embodiment of mobile communications system of the present invention includes a dispatch packet handler 48, a packet store 50, a packet user database (PUD) 52 and a service management terminal 54.

The packet handler 48 is responsible for setting up virtual connections between GPRS users in the PLMN, and for copying packets when data packets are to be distributed to groups of users.

The packet store 50 is responsible for storing data packets which are intended for distribution to GPRS users within the PLMN who are uncontactable via GPRS at the time of receipt of data packets for the uncontactable user at the packet handler 48.

The packet user database 52 holds service data records used by the packet handler 48 to set up and manage virtual connections between GPRS users in the PLMN. The service management terminal 54 is used to update the service data in the PUD 52.

Figure 4:
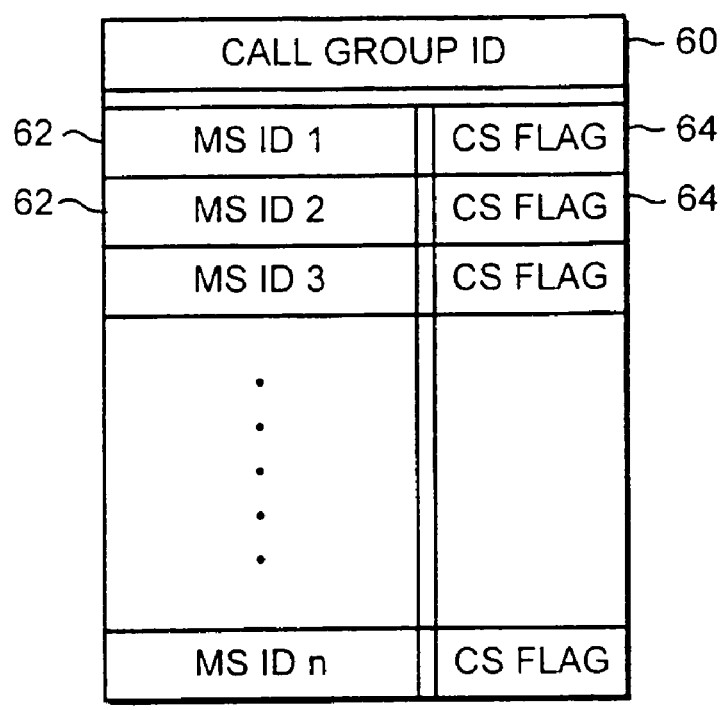
FIG. 4 is a schematic illustration of a call group record used in connection with embodiments of the present invention.

The PUD 52 holds call group records for identifying the members of a call group. Referring to FIG. 4, which shows an exemplary call group record, a field for a single call group is identified by a call group ID containing fields 60, two or more mobile station IDs, MSID1, MSID2 . . . MSIDn are contained in fields 62, and each mobile station ID field 62 has an associated call seize field 64 flagged to indicate that the associated mobile station has currently seized the call group.

Figure 5:
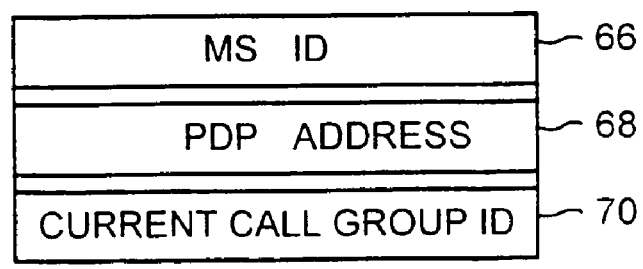
FIG. 5 is a schematic illustration of a mobile subscriber record store in connection with embodiments of the present invention.

In addition to call group records, the packet user database 52 stores identification records for each mobile subscriber in the PLMN who has a valid subscription to the GPRS virtual connection service of the present invention. Referring to FIG. 5, each such subscriber has a mobile subscriber record including a field 66 containing a permanent mobile station ID 66, a field 68 for containing an allocated PDP address, if current, and a field 70 for containing a call group ID, if current, for the mobile subscriber in question. If the PDP address field 68 is empty, this indicates that the mobile station is not currently attached to the GPRS service. If the current call group ID field 70 is empty, this indicates that the subscriber is not currently participating in a GPRS virtual connection call.

Figure 6:
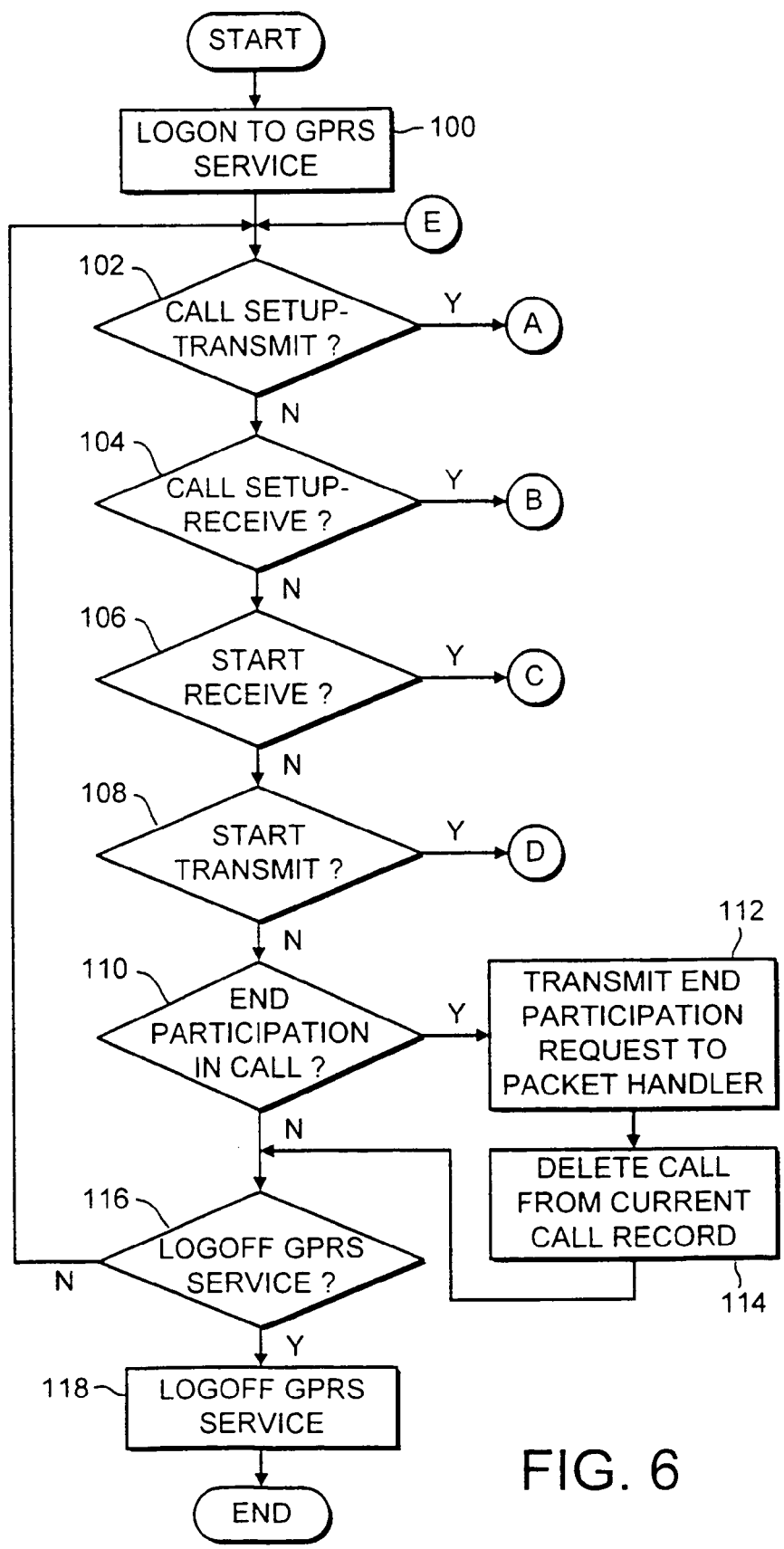
FIGS. 6, 7 and 9 are flow diagrams illustrating procedures carried out by mobile stations in accordance with embodiments of the present invention.

FIG. 6 illustrates procedures carried out in the mobile station 8 in order to participate in the GPRS virtual connection service of the present invention.

In order to utilise the GPRS service, the user initiates a GPRS logon procedure from the mobile station 8, step 100.

The GPRS logon signalling procedure is described in GSM 03.60 V.5.2.0, part 6.5 entitled "Attach Function", which part is incorporated herein specifically by reference. This part also refers to part 9.2.2 entitled "Activation Procedures" of the same document, which describes the PDP context activation procedure at logon, which part is also incorporated herein specifically by reference.

After having executed GPRS attach, the mobile station is in a "ready state", in which packet transfer may occur via the GPRS radio interface between the mobile station 8 and the PLMN, and mobility management contexts are established in the mobile station and the SGSN 40. The mobile station then activates its PDP context, by transmitting an 'Activate PDP Context' request to the SGSN 40. If the mobile station is using a static PDP address, it transmits its static PDP address in the 'Activate PDP Context' request.

The SGSN 40 queries the HLR 12, in which GPRS subscription information is held for the subscriber, in order to check that the mobile station 8 is allowed to activate the PDP address contained in the request. If allowed, the SGSN transmits a 'Create PDP Context' request to the GGSN 44, which creates a new entry in a PDP context table held in the HLR 12 on behalf of the GGSN 44. This PDP context table includes the mobile station identity and the PDP address allocated to the mobile station, allowing the GGSN 44 to map between these two identifies and thereby route data packets between the SGSN 40 and the packet data network 46.

If the mobile station 8 is not using a static PDP address, the 'Create PDP Context' request sent by the SGSN 40 to the GGSN 44 results in the GGSN allocating a dynamic PDP address, which is signalled, via the SGSN 40, to the mobile station 8.

Whether the mobile station is using a static PDP address or a dynamic PDP address, the mobile station 8 is provided in each case with a PDP address whereby routing for packets arriving from the packet data network 46 is identified. Routing within the PLMN is provided by the GPRS data packet encapsulation procedure, which encapsulation is removed from the data packets at the GGSN 44 and the mobile station 8. The encapsulation function is described in part 9.6 of the document GSM 03.60 V.5.2.0, which part is specifically incorporated herein by reference. GPRS transparently supports the transfer of PDP PDUs between external networks and the mobile stations. One encapsulation scheme (referred to herein as GSN—GSN encapsulation) is used for the GPRS backbone network between GSNs in the PLMN, and one (referred to herein as SGSN-MS encapsulation) is used for the GPRS connection between the SGSN 40 and the mobile station 8.

The GGSN 44 is arranged such that once the PDP context entry has been made in the HLR 12 by the GGSN 44 for a newly logged-on GPRS user, the GGSN 44 transmits a logon message to the packet handler, informing the packet handler 48 of the mapping between the mobile station identity, held in field 66 of the mobile station record held in the PUD 52, whereby the user is permanently identified in the PLMN, and the allocated PDP address. On receipt of the logon message, the packet handler 48 enters the allocated PDP address in field 68 of the mobile subscriber record for the subscriber in question.

Once logged-on to the GPRS service, the mobile station may transmit data packets to, and receive data packets from, the packet handler 48.

Data packets originated in the mobile station 8 are transmitted over the radio interface and via the BTS 6 and the BSC 4 to the SGSN 40. When the SGSN 40 has received a packet completely and correctly, it GSN—GSN encapsulates the packet into a GPRS backbone network packet which is sent to the GGSN 44. The GGSN 44 decapsulates the packet and forwards the data packet, using the PDP address allocated to the sender as the packet originating address in a header portion of the data packet, to the packet handler 48.

Data packets originated in the packet handler 48 are transmitted to a mobile station 8 by attaching the allocated PDP address, which is held in the PUD 52 for the recipient, to the data packet as a destination address in a header portion of the data packet. The data packet is transmitted, via the packet data network 46, to the GGSN 44. In the GGSN 44, the PDP address of the receiver is read, and the SGSN which is serving the mobile station is identified from routing data held in the HLR 12. The data packet is then GSN—GSN encapsulated and sent to the identified SGSN. The SGSN strips the GPS backbone network encapsulation, and the original data packet is SGSN-MS encapsulated and transmitted to the mobile station 8 via the BSC 4, BTS 6 and GPRS radio interface.

When the mobile station 8 receives the packet, it removes the SGSN-MS encapsulation and processes the data packet.

If the data packet is a voice data packet, a sequence of packets are reassembled and a voice signal is generated in the mobile terminal.

The user may set up a call by selecting, via a man machine interface, e.g. the keypad 32, of the mobile station 8, from a stored list of call groups of which the mobile user is a member, a call group for which a virtual connection is to be established. Such selection is part of the initiation of a call set up-transmit procedure, step 102, which is to be described below in relation to FIG. 7.

Once logged-on to the GPRS service, the mobile station 8 is able to receive call set up-receive requests from the packet handler 48, which initiates a procedure to be described below in relation to FIG. 9. Once participating in a call, the mobile station 8 is also able to start to receive call data packets, step 106, and start to transmit call data packets, step 108, to be described below in relation to FIGS. 7 and 8. In addition, a user has the facility to end participation in a call, by interaction with a man machine interface, e.g. the keypad 32, of the mobile station 8, step 110, which causes the mobile station to transmit an end participation request to the packet handler 48, step 112, and to delete the call group ID from its current call record, step 114.

The user may also logoff the GPRS service if desired, step 116, which results in logoff procedures carried out by the mobile station 8, step 118, including the deletion of the allocated PDP address for the subscriber in the HLR records stored by the GGSN 44. The GGSN 44 is arranged such that, on receiving a logoff message from the SGSN 40, the GGSN 44 also transmits a logoff message to the packet handler 48, which results in the deletion of the previously allocated PDP address from the PDP address field 68 in the mobile subscriber record held for the subscriber in the PUD 52.

Figure 7:
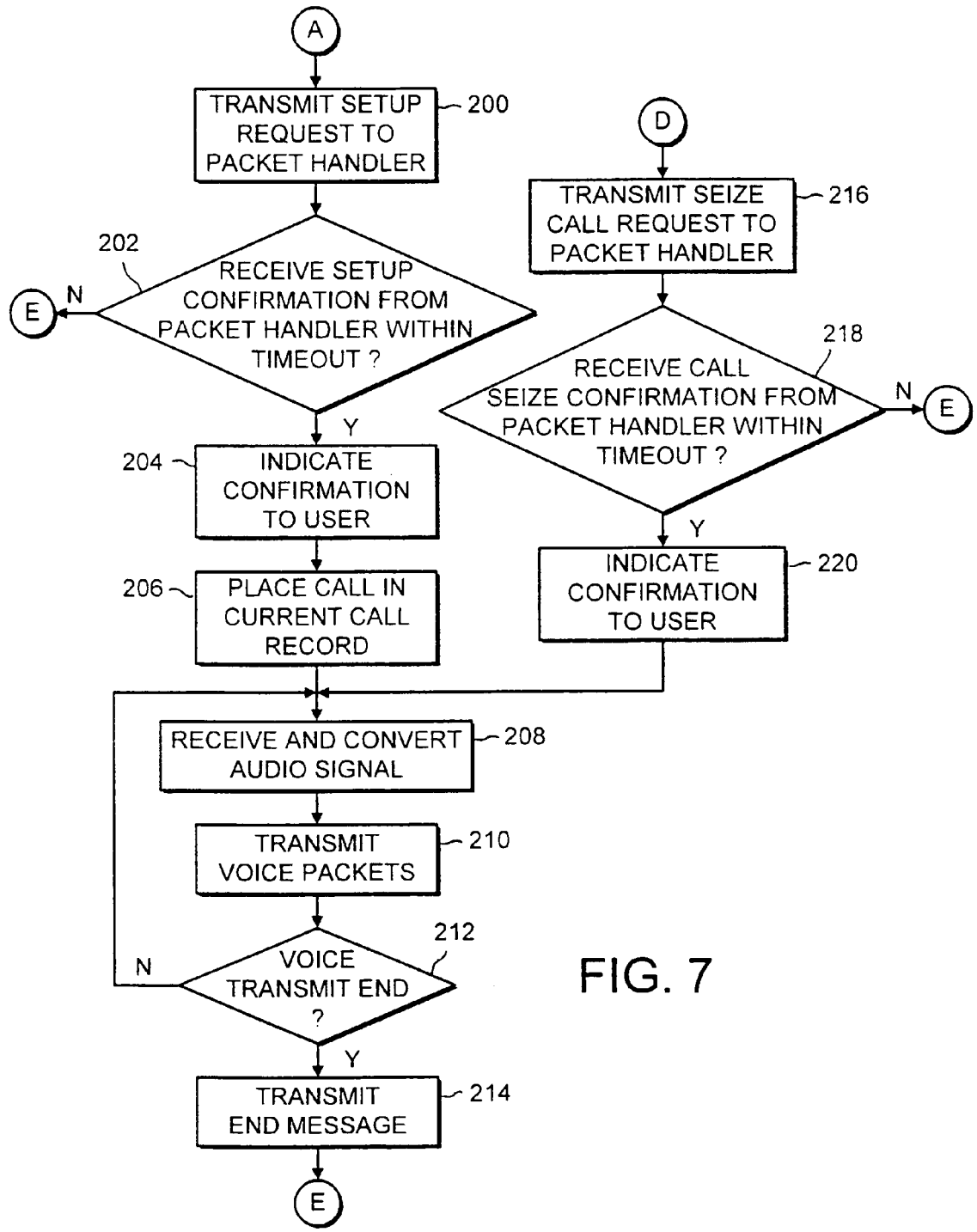

Referring to FIG. 7, when a user first instructs the mobile station 8 to set up a call for a particular call group, by the depression of the PTT button 34 after the selection of a call group from a list of call groups stored in the SIM of the mobile station 8, the mobile station 8 transmits a set up request, containing the selected call group ID, as one or more GPRS data packets to the packet handler 48, step 200. The call handler conducts procedures to be described below in relation to FIG. 8, and, depending on the success of those call set up procedures, the packet handler 48 may transmit a set up confirmation message to the mobile station within a time-out set within the mobile station 8, or not. If the call set up confirmation is not received within the time-out at the mobile station, step 202, the mobile station returns to the general GPRS logged-on state, and the mobile station 8 may retry by transmitting a further call set up request.

If the set up confirmation message is received from the packet handler 48 within the time-out, the mobile station 8 provides an audio or visual indication to the user that a virtual connection has been established, step 204. In addition, the mobile station places the call group ID selected by the user in a current call record, step 206.

At this point, the user may transmit voice data by speaking into the microphone 24 as long as the PTT button 34 remains depressed. The speech signals are coded by the codec 20 and passed on to the GPRS module 19, in which the speech data is packetised and buffered, step 208, and SGSN-MS encapsulated for transmission over the GPRS radio interface by the radio frequency transceiver 18 and onward to the packet handler 48, step 210.

As soon as the PTT button 34 is released, step 212, the mobile station 8 generates a transmit end message, in the form of a data packet, which is transmitted to the packet handler 48, step 214.

Figure 8:
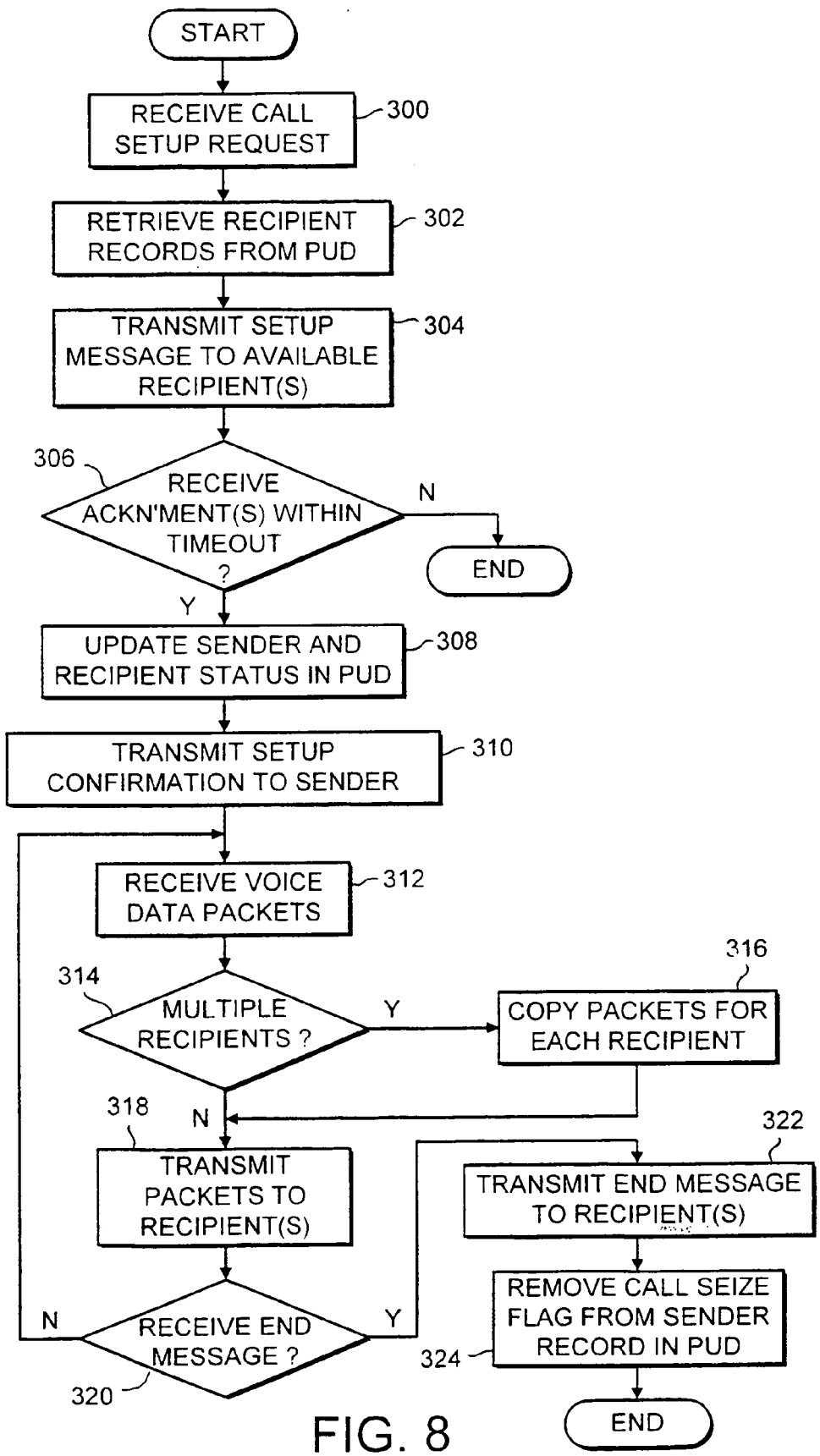
FIGS. 8, 10 and 11 are flow diagrams illustrating procedures carried out by a data packet handler in accordance with embodiments of the invention.

Referring to FIG. 8, on receipt of a call set up request, step 300, the packet handler 48 retrieves, using the call group ID contained in the call set up request, the recipient records from the PUD 52 which identify the recipients which are currently available for receipt of a call set up message, step 302. Each mobile station in the call group record has an associated mobile station record which is identified by the mobile station ID contained in the call group record. For each mobile station record which contains a PDP address and no current call group ID, a set up message is transmitted by the packet handler, using the PDP address retrieved for the mobile station in question, step 304. Mobile station records which contain either no allocated PDP address or contain a current call group ID are placed in a call waiting list in the PUD 52, and voice data packets subsequently received for the same call group are forwarded to the packet store 50 for storage. In the case of a potential recipient not yet logged-on to the GPRS service, on receipt of notification at the packet handler 48 that the recipients have subsequently logged-on, a set up message is then transmitted, to allow the previously unavailable recipient to receive the data held in the packet store 50 if desired. Similarly, if a potential recipient is unavailable because the recipient is engaged in a different call, once the packet handler 48 receives an end participation message from the potential recipient for the previous call, the packet handler responds by transmitting a set up message to the previously unavailable recipient, to allow the recipient to receive data previously held in the packet store 50 if desired.

If the packet handler receives no acknowledgements from the available recipients to which set up messages have been sent within a time-out set in the packet handler 48, step 306, the call set up has been unsuccessful and the packet handler ends the procedure without storing any references to the call set up attempt either in the PUD 52 or in the packet store 50.

Otherwise, the packet handler 48 enters the call group ID into the current call group field 70 for both the call set up request sender and the call set up message recipients which have acknowledged call set up, step 308. As further recipients acknowledge call set up, the current call group ID is entered into the call group ID field 70 for each of the additional recipients.

In addition, the packet handler 48 sets the call seize flag in the field 64 of the call group record which corresponds to the mobile station ID of the call set up request sender, and transmits a set up confirmation message to the sender, step 310, indicating that the sender is now able to transmit voice data, step 310.

Once the sender receives the set up confirmation message, as described in relation to FIG. 7, the sender presses the PTT button 34 and begins the transmission of voice data packets, which are received at the packet handler 48, step 312. If the number of recipients currently participating in the call exceeds a single recipient, step 314, the packet handler 48 replicates the contents of each packet for each recipient, step 316.

The receive packets are then transmitted to each participating recipient, step 318, until such time as an end message is received from the voice packet transmitting mobile station 8, step 320. Once the end message is received from the sending mobile station 8, an end message is transmitted to each recipient, step 322, and the call seize flag is removed from field 64 in the call group record corresponding to the sender mobile station ID, in the PUD 52, step 324.

Figure 9:
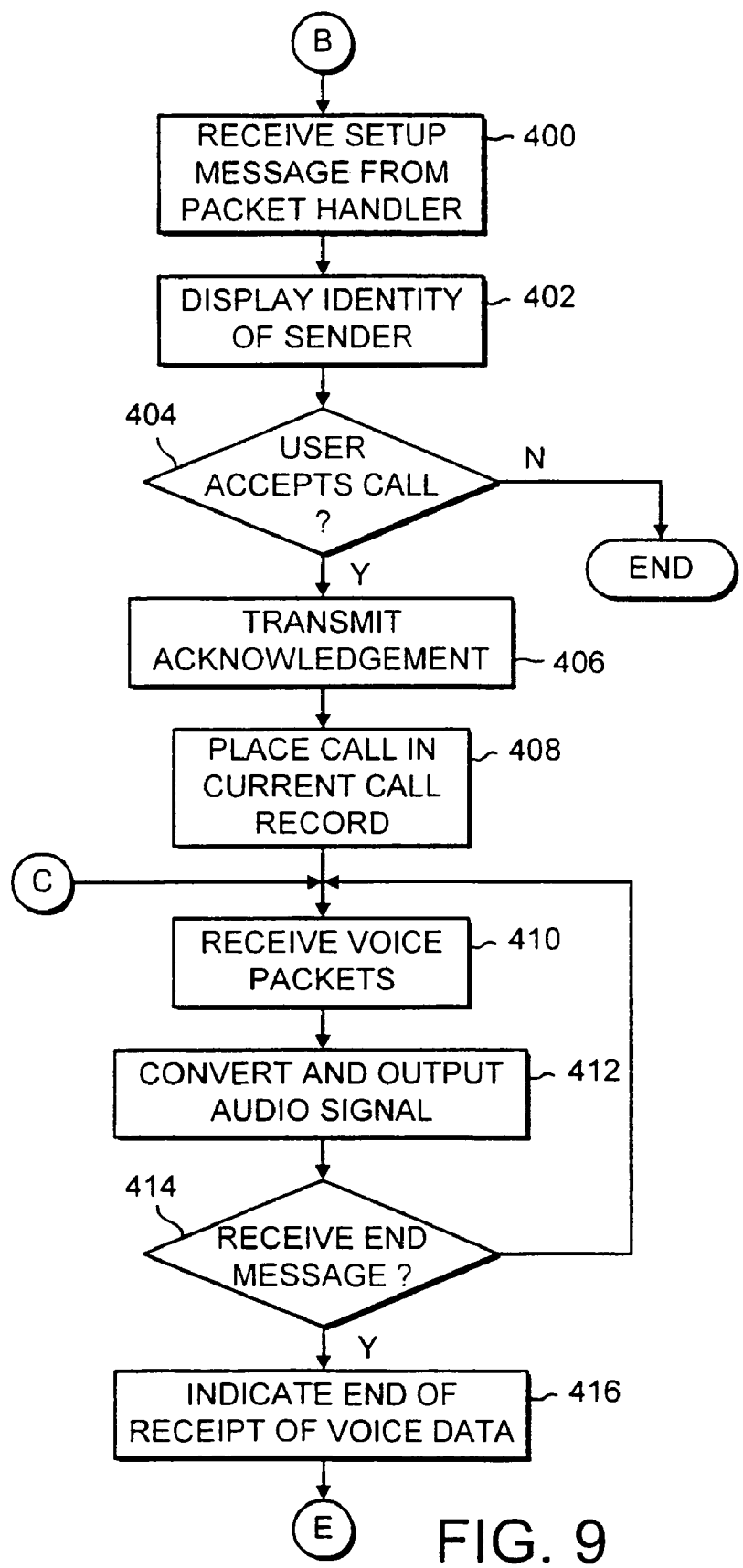

Referring to FIG. 9, when a mobile station 8 receives the set up message from the packet handler 48, step 400, the mobile station 8 displays the identity of the sender, which is contained in a header portion of the data packet, including the call group ID and the name of the individual subscriber, step 402. In response, the recipient may accept the call by interaction with the man machine interface of the mobile station, step 404. If the user does not accept, the mobile station does not respond to the set up message. Otherwise, the mobile station 8 transmits an acknowledgement to the packet handler 48 and places the call group ID in the current call record held in the mobile station memory 28, steps 406 and 408.

As a result of the acknowledgement received at the packet handler 48, any data packets subsequently transmitted by the voice data sender is then transmitted, using the virtual connection provided by the packet handler 48, to the recipient mobile station 8, step 410. At the recipient mobile station 8, the data packets are converted into voice data and output as an audio signal, step 412, until such time as an end message is received from the packet handler 48, step 414.

On receipt of the end message, the recipient mobile station provides the user with an audio or visual indication of the end of receipt of the voice data packets, step 416, to indicate that the call group may now be seized if desired by the recipient.

In order to seize the call group, following call set up, any participant may push the PTT button 44 in a period of inactivity, that is to say, in the case of a previously receiving mobile station, after receipt of a transmit end message as in step 214 and preceding receipt of further voice data packets from other parties, and in the case of a previously transmitting mobile station, after the user releases the press to talk button and before receipt of voice data packets from other parties.

Referring again to FIG. 7, when the mobile station 8 detects pressing of the PTT button in this inactive state, the mobile station 8 transmits a call seize request to the packet handler 48, step 216. The call group ID held in the current call group ID record in the mobile station 8 is included in the call seize request message automatically by the mobile station. The user therefore does not need to re-identify the call group of the call in which he is currently participating.

If no call seize confirmation is received from the packet handler 48 within a time out period set within the mobile station 8, the mobile station 8 may retry to seize the call at a later stage, by the transmission of a further call seize request.

If a call seize confirmation message is received from the packet handler 48, step 218, an audio or visual indication is provided to the user to indicate success, step 220, after which the user is able to transmit his voice to all of the current call group participants by keeping the PTT button held down and speaking into the microphone 24 of the mobile station 8.

Figure 10:
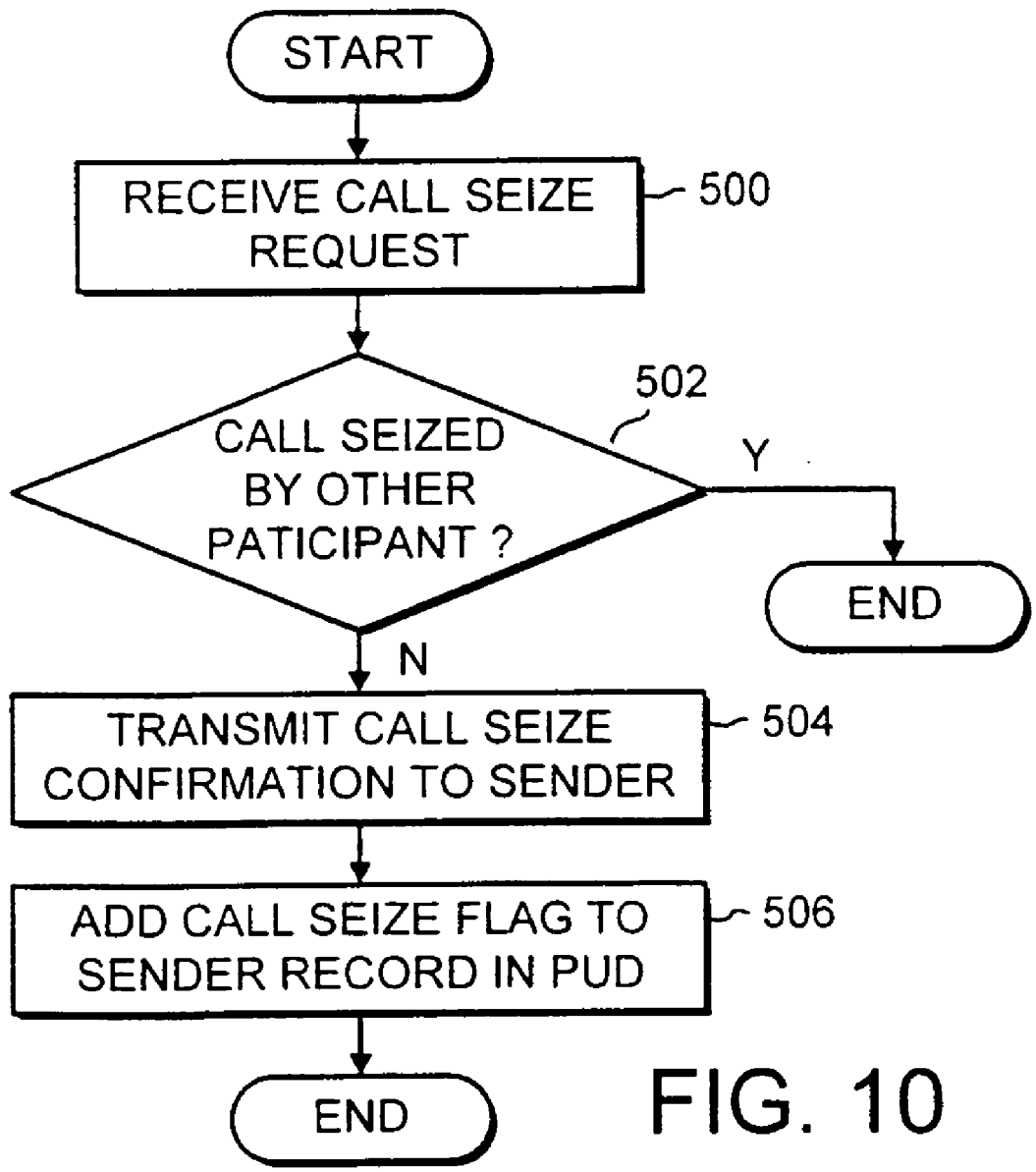

Referring to FIG. 10, on receipt of a call seize request, step 500, the packet handler 48 queries the PUD 52, step 502, in order to determine whether another participant in the call has current seizure of the call group, as will be indicated by a call seize flag held in a field 64 of the call group record. If no call seize flag appears in the call group record, the packet handler 48 transmits a call seize confirmation message to the sender of the call seize request, step 504, and adds a call seize flag to the field 64 corresponding to the sender in a call group record held in the PUD, step 506.

Figure 11:
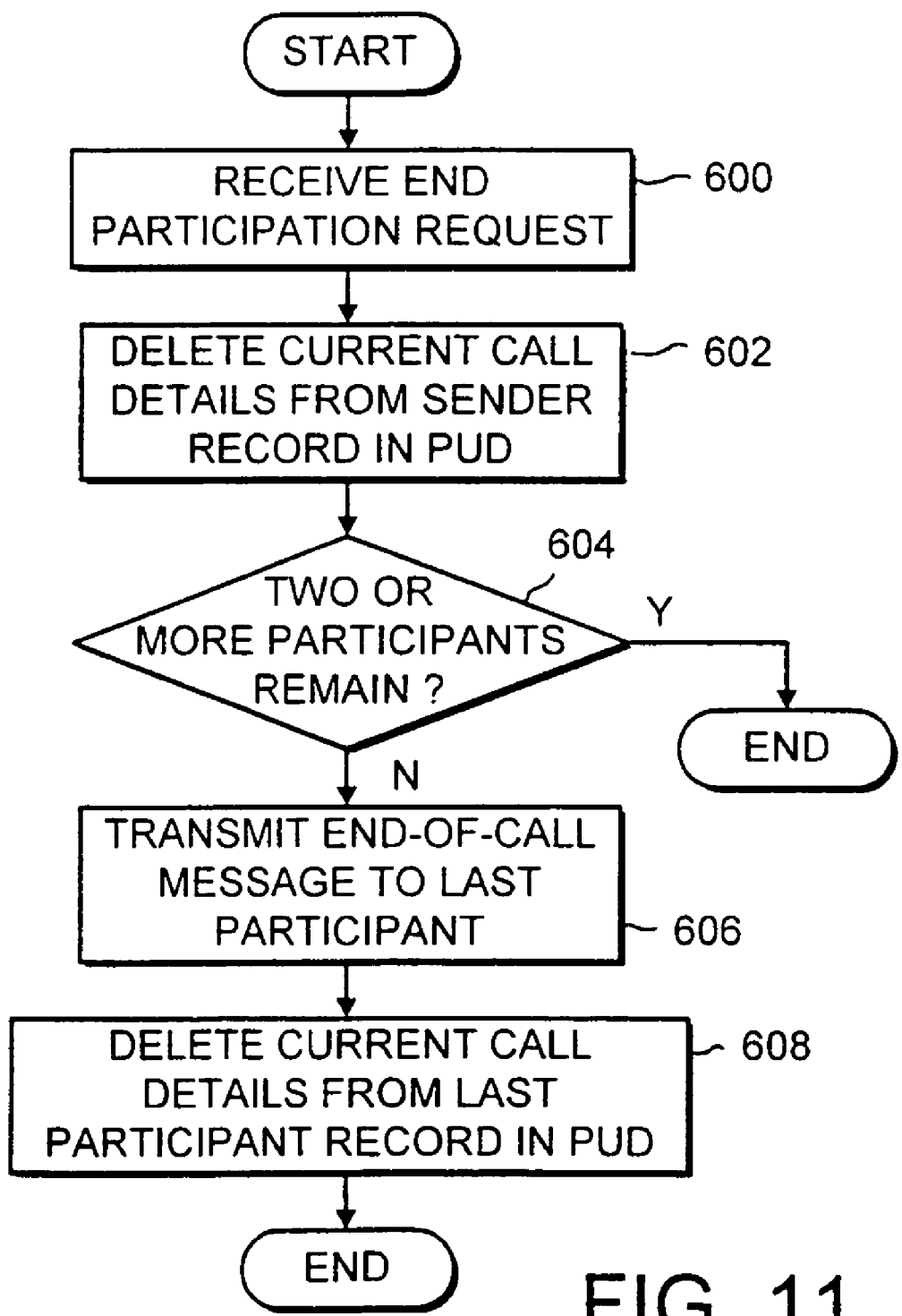

Referring to FIG. 11, on receipt of an end participation request from a mobile station of a user currently participating in a call, step 600, the packet handler 48 deletes the call group ID from the current call group field 70 of the record held in the PUD 52 for the sender of the end participation request, step 602.

If only one participant then remains in the call, step 604, the last remaining participant is sent an end-of-call message, step 606, and the call group ID is deleted from the current call group field in the last participant's record held in the PUD 52, step 608. The unavailable recipient records are also deleted from the call waiting list in the PUD, and the voice data packets stored in the packet store 50 for the call group are deleted.

Figure 12:
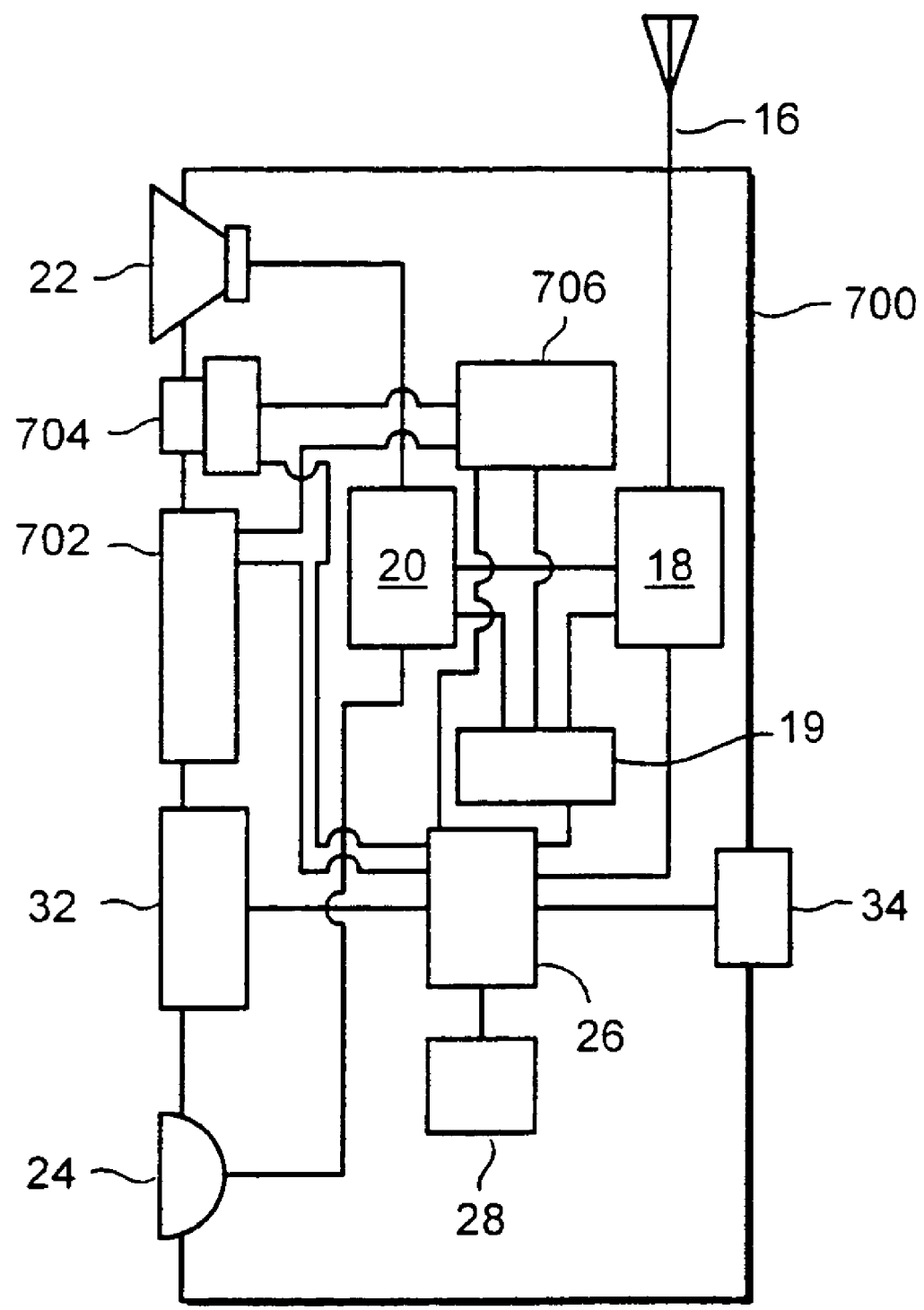
FIG. 12 is a schematic block diagram of a second embodiment of a mobile station in accordance with the present invention.

FIG. 12 illustrates a further embodiment of mobile station 700 in accordance with the present invention. The mobile station 700 includes components described in relation to the embodiment of mobile station illustrated in FIG. 2. These components are referenced with the same reference numerals, and share functionality described in relation to the mobile station 8.

The mobile station 700 is therefore capable of conducting GPRS virtual connection voice calls as described in relation to FIGS. 2 to 11, by the user operating the keypad 32 and PTT button 34. In addition, the mobile station 700 is operable in a video conferencing mode.

The mobile station 700 includes an LCD-type display 702, capable of displaying still and video images, in place of the alphanumeric display 30 of the mobile station 8. In addition, the mobile station 700 includes a CCD camera 704, capable of picking up still and/or video images, and an image data codec 706, capable of coding and decoding still and/or video images in accordance with known still and/or video coding techniques, such as Jpeg and/or Mpeg-4.

The image data codec 706 interfaces with the GPRS module 19, so as to allow image data to be packetised and depacketised and transferred via the GPRS radio interface.

The mobile station 700 interacts with the system described in relation to FIG. 2, and in particular the packet handler 48, in the same manner as described in relation to each of FIGS. 6 to 11. Thus, the packet handler is capable not only of forming virtual voice data connections for two-party calls or group dispatch-type calls, but also capable of forming virtual image data connections. The dynamic bandwidth allocation functionality provided by GPRS allows the transmission of data at a sufficient rate to transmit video data captured by the video camera 704 and coded in the image data codec 706, via the GPRS radio interface.

Referring to FIG. 7, when using the mobile station 700 in a video conferencing mode, the procedures previously described are conducted in order for the mobile station to set up and seize a video call, and to transmit video and audio data for receipt at one or more call group participants in the PLMN. In this regard, step 208 previously described in relation to FIG. 7 involves the reception of video data at the video camera 704 and its conversion in the video codec 706, in addition the pickup of audio data at the microphone 24 and its conversion in the audio codec 20. Step 210, meanwhile, involves the transmission of both audio and video data, either in separate data packets or in the same data packets, whilst the PTT button 34 remains actuated. In this regard, although referred to as a "PTT" button, this is intended to include a "press to transmit audio and video" button.

In a further mode, the image data accompanying the audio data in step 210 is still image data picked up at the camera 704 and coded by the image data codec 706.

In a yet further mode, the mobile station 700 is arranged to transmit image data, being video or still image data, alone, in step 210.

The particular mode employed in the mobile station 700 is selectable by the user of the mobile station via interactions with the man machine interface, e.g. the keypad 32.

Referring to FIG. 8, the packet handler 48 is capable of performing the procedures previously described to receive and respond to the call set up request for an image and/or audio call. In this regard, in step 312, the packet handler may receive image data packets and/or voice data packets during seizure of a call by a recipient. The packet handler 48 handles the packets transparently, without regard to the content of the data packets received.

Referring to FIG. 9, the mobile station 700 is capable of receiving call set up messages, and accepting same, for both image and audio calls. In this regard, in step 410, the data packets received via the GPRS radio interface include image and/or voice data packets, and step 412 involves the conversion of those data packets in the image data codec and/or the voice codec, and the output of images and/or audio signals on the display 702 and/or by the loudspeakers 22.

Thus, this embodiment of the invention provides a method and apparatus whereby half-duplex video conferencing calls may be conducted, either between two parties, or in a dispatch mode between groups of call participants. It is advantageous, in that video data, which requires relatively high amounts of bandwidth, is transmitted only in one direction at a time, and only intermittently when a user of the system wishes to transmit image data. In addition, the power requirements for the mobile station may be relatively low. This is to be contrasted with the conventional concept of a video conferencing call, in which video data is transmitted continuously in full duplex mode.

It is to be understood that various modifications and equivalents may be employed in relation to the embodiments described above, without departing from the scope of the present invention.

The embodiments for mobile terminal 700 described are operable in both a GPRS virtual connection mode and a conventional circuit-switched mode. Other embodiments of the invention include mobile stations which are operable only in the GPRS virtual connection mode of the present invention.

The GPRS virtual connection mode described above in relation to the two embodiments of the invention is by nature half-duplex, insofar as only one party to the call may transmit voice and/or image data at a time. However, GPRS allows the simultaneous transmission and reception of data packets via the radio interface, and therefore, in the case of two-party calls, voice and/or image data transfers may occur at the same time, in order to provide a full-duplex virtual connection. In this case, neither of the parties "seizes" the call group, and neither party is prevented from transmitting voice and/or image data when receiving such data.

In the above described embodiments, the GGSN 44 transmits logon and logoff messages to the packet handler 48 when a subscriber attaches and detaches to the GPRS service. Other signalling procedures are possible. For example, the packet handler 48, when receiving a call set up request, may query the HLR and/or the GGSN 44 in order to determine the current status of a potential call participant. Logon/logoff messages may also be transmitted to the packet handler 48 from the HLR 12, instead of from the GGSN 44.

In the above described embodiments, control messages passed between a mobile station and the packet handler 48 include a call group ID, to be referenced against the call group records. In the case of a two-party call, such a call group ID may be replaced by a single recipient ID, referenced to a single recipient record in the PUD 52.

In the above, the packet data network 46 is referred to as an external packet data network. The packet data network 46 is 'external' insofar as it is beyond the GGSN 44, but it may be under the ownership and control of the PLMN operator. Thus it may form part of an intranet, or suchlike. It may also take the form of a single physical link between the GGSN 44 and the packet handler 48. The functions of the packet handler 48 may be integrated with those of the GGSN 44.

In the above description, virtual connections between mobile stations operating in the same PLMN are controlled by the packet handler. As illustrated in FIG. 3, a GGSN 56 of another PLMN is also accessible, via the packet data network 46 from the packet handler. Therefore, the packet handler may also be used to set up virtual connections between mobile stations operating within the PLMN illustrated, and mobile stations operating in other PLMNs which include a GPRS infrastructure. In addition, the packet handler 48 is also able to control virtual connections between a mobile station operating in the PLMN illustrated and fixed terminals, such as the fixed terminal 58 illustrated in FIG. 3, connected to the packet data network 46.

In the above described embodiments, the seizure of a call group, and the period for which a mobile station transmits voice and/or image data is defined by the manual depression of the PTT button 36. Other man machine interface interactions may also be used to define a call seize operation and the period for which the mobile terminal transmits voice or image data, for example those operations and periods may be voice-activated.

In the above described embodiments, the packet store 50 holds data packets received during a virtual call connection, for potential call participants. In addition, the packet store may be used to hold voicemail messages and data messages received via the GPRS service and to be transmitted onwards via the GPRS service. In addition, the packet store 50 may hold information to be communicated to user stations via the GPRS service on request, such as stock price information, news and weather, etc, provided as textual information, still image information, audio information and/or video information.

Embodiments of mobile terminal other than the handsets described are envisaged. For example, the mobile terminal may be a car telephone, consisting of a GPRS-enabled hardware unit installed in the vehicle and a hand-held microphone/push-to-talk unit connected to the hardware unit via a wire cord.

In the above, the transfer of audio and image data in half-duplex communications modes has been described. The data packets transferred by the packet handler 48 between user stations may also form textual messages (short messages) which may be transmitted within the context of a call, or in a call-independent context. Preferably, the transfer of text messages is not restricted by the packet handler 48, the packet handler serving only to identify available recipients and recipient addresses from the PUD 52 for a text message to be transferred, and to store messages in the packet store 50 for unavailable recipients.

Herein, reference is made to GSM-type systems. Such systems include ones which are at least partly based on the GSM system defined in the GSM technical specifications published by the European Telecommunications Standards Institute (ETSI), such as DCS1800 systems, PCS1900 systems and third generation systems (such as UMTS) based at least partly on GSM.

It is envisaged that modifications and variations to the above-described embodiments may be employed, without departing from the scope of the invention, which is defined in the appended claims.

What is claimed is:

1. A method of controlling communication between user stations using a mobile communications system having a radio interface, said method comprising:
    establishing a call session between a first user station and at least a second user station over said radio interface, wherein the call session is configured for communication of voice signals between said first and second user stations;
    providing a data packet handler connected to a packet data network, wherein said data packet handler is configured to transfer data packets carrying call data between said first user station and said second user station during said call session;
    during said call session, receiving requests to transfer data packets carrying call data between said first user station and said second user station, and dynamically assigning radio resources for transfer of said data packets over said radio interface, wherein an amount of radio resource assigned varies in accordance with the amount of call data requiring transfer at different times during said call session as a result of said requests;
    holding control data relating to said call session between said first user station and said second user station, wherein said control data includes data indicating a state of said call session and data identifying the user stations participating in said call session; and
    during said call session, controlling the transfer of data packets carrying call data between said first and second user stations using said data packet handler in accordance with said control data.

2. The method of claim 1, wherein said control data indicates an existence of said call session.

3. The method of claim 1, wherein said control data indicates identities of participants in said call session.

4. The method of claim 1, wherein said control data indicates a seizure of said call session by one of said user stations.

5. The method of claim 1, additionally comprising receiving a call session setup request from said first user station at said packet handler, and transmitting a call session setup confirmation message to said first user station.

6. The method of claim 5, additionally comprising transmitting a call session setup message to said second user station from said packet handler, and transmitting said call session setup confirmation message after an acknowledgement is received from said second user station.

7. The method of claim 1, additionally comprising accessing a data store from said packet handler to determine an address of said second user station in order to address data packets to be transmitted thereto.

8. The method of claim 1, additionally comprising seizing said call session by said first user station.

9. The method of claim 8, additionally comprising controlling said transfer to prevent the transfer of data packets to said first user station when said first user station has seized the call session.

10. The method of claim 8, additionally comprising granting call session seizure to said second user station when said first user station no longer has seizure of the call session.

11. The method of claim 1, additionally comprising copying data packets received from said first user station for transmission to a plurality of call session participant user stations including said second user station.

12. The method of claim 1, wherein said control data is held in a data store accessible by said data packet handler.

13. The method of claim 1, wherein said mobile communications system is a GSM-type mobile communications system, said method comprising:
receiving data packets at said data packet handler from a first user station via a GPRS data link.

14. The method of claim 1, wherein said mobile communications system is a GSM-type mobile communications system, said method comprising:
transmitting data packets from said data packet handler to a second user station via a GPRS data link.

15. The method of claim 13, wherein said data packet handler is connected to a GPRS support node.

16. A method of handling transfer of data in a call session established in a GSM-type mobile communications system between two or more user stations, wherein said transfer of data takes place between said two or more user stations participating in said call session, said method comprising:
receiving a first data packet from a first user station, said first data packet containing a recipient ID;
mapping said recipient ID to a packet network protocol address, wherein the packet network protocol address identifies a route to a second user station via a gateway GPRS support node; and
transmitting a second data packet to said gateway GPRS support node, said second data packet containing said packet network protocol address.

17. The method of claim 16, wherein said data packets comprise voice data.

18. The method of claim 16, wherein said data packets comprise still or video image data.

19. A data packet handler for a mobile communications system adapted to perform data packet handling functions comprising transfer of data packets carrying call data between two or more user stations participating in a call session established in the mobile communications system, said data packet handler comprising:
a first port to receive and transmit data packets to and from user stations;
a second port to communicate with a packet user database to receive call control data, wherein said control data indicates a state of a call session and data identifying user stations participating in a call session; and
a means for processing the data packets, wherein the processing means is configured to dynamically assign radio resources for transfer of said data packets carrying call data between said two or more user stations participating in a call session, wherein the data packets are transferred in accordance with said control data, such that an amount of radio resources varies in accordance with the amount of call data to be transferred.

20. A mobile station adapted to communicate with a data packet handler during participation in a call session in which other user stations are participating, said mobile station comprising:
means for dynamically requesting resources for transmission of data packets carrying call data over a radio interface during a call session to one or more participating user stations, wherein the amount of radio resources requested varies in accordance with the amount of call data to be transmitted at different times during said call session; and
means for transmitting and receiving control data to and from said data packet handler to signal call-related control functions, said control data including data on a status of said call session and/or the identities of user stations participating in said call session.

21. A method of conducting communications between user stations using a mobile communications system, each said user station comprising a camera for picking up video image of a user and a display for displaying an image of a remote party, said method comprising:
establishing a call session between participating user stations in which video data transfer can take place between said user stations at different times during said call session, wherein said video data represents a video image picked up by a camera of a participating user station; and
during said call session, controlling said video transfer in a half-duplex mode such that a user station may perform one of either only receiving or only transmitting video data for a first period sufficient to receive or transmit video data that is subsequently used to display a video image on a display of a receiving user station, and perform the other of only receiving or only transmitting video data for a second period following said first period, sufficient to transmit or receive video data that is subsequently used to display a video image on a display of a receiving user station.

22. The method of claim 21, wherein the image data transmitted and received during the first and second periods forms a complete image of the user or a remote party.

23. The method of claim 21, wherein said image data comprises video image data, and wherein a length of a period of transmission is variable by the user of the user station.

24. A mobile station adapted to participate in a call session with one or more other mobile stations to conduct video communications with said one or more other mobile stations, said mobile station having a half-duplex communications mode for use during a call session that is established between said mobile station and one or more other mobile stations, wherein said communications mode is controlled by a data processor which prevents transmission of video data during reception of video data when in said half-duplex communications mode during said call session and which allows the transmission of video data during a period of said call session selected by a user.

25. The mobile station in accordance with claim 24, wherein said period is selected by an actuation by the user of a switch on said mobile station.

26. The mobile station of claim 25, wherein said selected period is defined by a period of which said switch is manually held by the user.

27. The mobile station of claim 25, comprising a data store for storing a group identified for transmission in association with the video data, to enable the video data to be transmitted to a plurality of recipient user stations.

28. A mobile communications station having a group dispatch mode of operation, said station comprising a camera for video data capture and means for transmitting said video data in said group dispatch mode.

29. A method of controlling communication between user stations using a GSM-type mobile communications system, said method comprising:
establishing a call session between a first and second user station, wherein the call session is configured for communication between said user stations;
providing a data packet handler connected to a GPRS support node for transferring data packets carrying call data between said user stations during said call session;

holding control data relating to said call session between said first user station and said second user station, in a data store accessible by said data packet handler, wherein said control data includes data indicating a state of said call session and data identifying user stations participating in said call session; and during said call session, controlling the transfer of data packets between said first and second user stations via a GPRS data link, using said data packet handler, in accordance with said control data.

* * * * *